US011313696B2

(12) United States Patent
Ahmad et al.

(10) Patent No.: US 11,313,696 B2
(45) Date of Patent: Apr. 26, 2022

(54) METHOD AND APPARATUS FOR A CONTEXT-AWARE CROWD-SOURCED SPARSE HIGH DEFINITION MAP

(71) Applicants: GM Global Technology Operations LLC, Detroit, MI (US); University of Southern California, Los Angeles, CA (US)

(72) Inventors: Fawad Ahmad, Los Angeles, CA (US); Hang Qiu, Los Angeles, CA (US); Ramesh Govindan, Cerritos, CA (US); Donald K. Grimm, Utica, MI (US); Fan Bai, Ann Arbor, MI (US)

(73) Assignees: GM Global Technology Operations LLC, Detroit, MI (US); University of Southern California, Los Angeles, CA (US)

( * ) Notice: Subject to any disclaimer, the term of this patent is extended or adjusted under 35 U.S.C. 154(b) by 244 days.

(21) Appl. No.: 16/290,268

(22) Filed: Mar. 1, 2019

(65) Prior Publication Data
US 2020/0278217 A1 Sep. 3, 2020

(51) Int. Cl.
*G01C 21/36* (2006.01)
*G01C 21/32* (2006.01)
(Continued)

(52) U.S. Cl.
CPC ......... *G01C 21/3667* (2013.01); *G01C 21/32* (2013.01); *G01S 19/45* (2013.01);
(Continued)

(58) Field of Classification Search
CPC ........ G01C 21/00; G01C 21/26; G01C 21/28; G01C 21/30; G01C 21/32; G01C 21/34;
(Continued)

(56) References Cited

U.S. PATENT DOCUMENTS 10,395,117 B1 *   8/2019   Zhang .................. G01C 21/206
10,832,414 B2 * 11/2020   Pfeiffer ................. G06N 20/00
(Continued)

*Primary Examiner* — Sze-Hon Kong
*Assistant Examiner* — Michael Allen Brace, Jr.
(74) *Attorney, Agent, or Firm* — Quinn IP Law

(57) ABSTRACT

A vehicle is described, and includes an on-board controller, an extra-vehicle communication system, a GPS sensor, a spatial monitoring system, and a navigation system that employs an on-vehicle navigation map. Operation includes capturing a 3D sensor representation of a field of view and an associated GPS location, executing a feature extraction routine, executing a semantic segmentation of the extracted features, executing a simultaneous location and mapping (SLAM) of the extracted features, executing a context extraction from the simultaneous location and mapping of the extracted features, and updating the on-vehicle navigation map based thereon. A parsimonious map representation is generated based upon the updated on-vehicle navigation map, and is communicated to a second, off-board controller. The second controller executes a sparse map stitching to update a base navigation map based upon the parsimonious map representation. The on-vehicle navigation map is updated based upon the off-board navigation map.

17 Claims, 5 Drawing Sheets

(51) Int. Cl.
*G05D 1/00* (2006.01)
*G05D 1/02* (2020.01)
*G01S 19/45* (2010.01)

(52) U.S. Cl.
CPC ......... *G05D 1/0088* (2013.01); *G05D 1/0246* (2013.01); *G05D 1/0278* (2013.01); *G05D 2201/0213* (2013.01)

(58) Field of Classification Search
CPC ..... G01C 21/36; G01C 21/3667; G01S 19/00; G01S 19/38; G01S 19/39; G01S 19/42; G01S 19/45; G05D 1/00; G05D 1/0088; G05D 1/02; G05D 1/021; G05D 1/0231; G05D 1/0246; G05D 1/0276; G05D 1/0278; G05D 2201/00; G05D 2201/02; G05D 2201/0213
See application file for complete search history.

(56) References Cited

U.S. PATENT DOCUMENTS

| | | | |
|---|---|---|---|
| 2014/0172296 A1* | 6/2014 | Shtukater | G01S 19/13 |
| | | | 701/522 |
| 2018/0188039 A1* | 7/2018 | Chen | G01C 21/32 |
| 2018/0188059 A1* | 7/2018 | Wheeler | G01C 21/3635 |
| 2019/0023266 A1* | 1/2019 | Kouri | G01C 21/32 |
| 2019/0139403 A1* | 5/2019 | Alam | H04W 4/40 |
| 2019/0154842 A1* | 5/2019 | Adachi | G01S 19/43 |
| 2019/0197778 A1* | 6/2019 | Sachdeva | G06T 17/05 |
| 2019/0258737 A1* | 8/2019 | Wang | G06F 16/29 |
| 2020/0134849 A1* | 4/2020 | Blasco Claret | G06T 7/579 |
| 2020/0201899 A1* | 6/2020 | Lin | G01C 21/3889 |

\* cited by examiner

METHOD AND APPARATUS FOR A CONTEXT-AWARE CROWD-SOURCED SPARSE HIGH DEFINITION MAP

INTRODUCTION

The present disclosure relates to navigation systems for vehicles, including systems and methods for constructing and detailing digitally-stored maps, and vehicle control based thereon.

Vehicles configured for autonomous operation are capable of complete or partial control of one or more vehicle functions of acceleration, deceleration, braking, and/or steering with some level of autonomy apart from an operator. An autonomous vehicle may be equipped with sensors to monitor its environment, including, e.g., radar devices, lidar devices, and imaging cameras. An autonomous vehicle may be capable of off-vehicle communications via vehicle-to-vehicle (V2V) communications, and other communications that may be referred to as vehicle to everything (V2x) communications, which can include infrastructure, intelligent highway and other systems. An autonomous vehicle may be equipped with a navigation system, which may include a positioning system such as a global positioning system (GPS) sensor.

An on-vehicle navigation system may rely upon a digitally-stored navigation map, which may be a high-definition (HD) map. Operation of an autonomous vehicle may be enhanced by improved precision and up-to-date map details, including presence and location of dynamic, semi-dynamic and static objects that may be present in a travel path.

It is desirable to have a navigation map that is accessible to an on-vehicle navigation system that has precise details related to locations of intersections, road signs, traffic signals, lane markings, sidewalks, crosswalks, etc. It is also desirable to have a navigation map that may be periodically updated while being cognizant of demands and limitations that may be imposed by wireless communication protocols such as 3G, 4G, 5G, etc. It is also desirable to have a navigation map that may be periodically updated employing information from other vehicles.

SUMMARY

A subject vehicle is described, and includes an on-board controller, an extra-vehicle communication system, a GPS sensor, a spatial monitoring system, and a navigation system that employs an on-vehicle navigation map. A method for controlling the vehicle includes capturing, via the spatial monitoring system, a 3D sensor representation of a field of view proximal to the subject vehicle and an associated GPS location, executing a feature extraction routine to extract features from the 3D sensor representation, executing a semantic segmentation of the extracted features from the 3D sensor representation, executing a simultaneous location and mapping (SLAM) of the extracted features from the 3D sensor representation and the associated semantic segmentation, executing a context extraction from the simultaneous location and mapping of the extracted features, and updating the on-vehicle navigation map based upon the context extraction. A parsimonious map representation is generated based upon the updated on-vehicle navigation map, and is communicated to a second controller, wherein the second controller is an off-board controller. The second controller executes a sparse map stitching to update a base navigation map based upon the parsimonious map representation. The on-vehicle navigation map is updated based upon the off-board navigation map.

An aspect of the disclosure includes controlling operation of the subject vehicle based upon the updated on-vehicle navigation map.

Another aspect of the disclosure includes an autonomous operating system, wherein controlling operation of the subject vehicle based upon the updated on-vehicle navigation map includes controlling the autonomous operating systems based upon the updated on-vehicle navigation map.

Another aspect of the disclosure includes generating a parsimonious map representation based upon the updated on-vehicle navigation map, which includes a set of features that are extracted from the environment that are defined by their feature descriptors, semantic labels, and 3D positions along with their vantage points.

Another aspect of the disclosure includes executing a progressive relocalization scheme to execute sparse map stitching to update the cloud-based navigation map based upon the parsimonious map representation.

Another aspect of the disclosure includes executing a one-shot relocalization scheme to execute sparse map stitching to update the cloud-based navigation map based upon the parsimonious map representation.

Another aspect of the disclosure includes adding semantic segmentation to the SLAM map to execute the simultaneous location and mapping of the extracted features from the 3D sensor representation and the associated semantic segmentation Another aspect of the disclosure includes the off-board controller being cloud-based.

Another aspect of the disclosure includes the off-board controller being a remotely located back office controller.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

Figure 1:
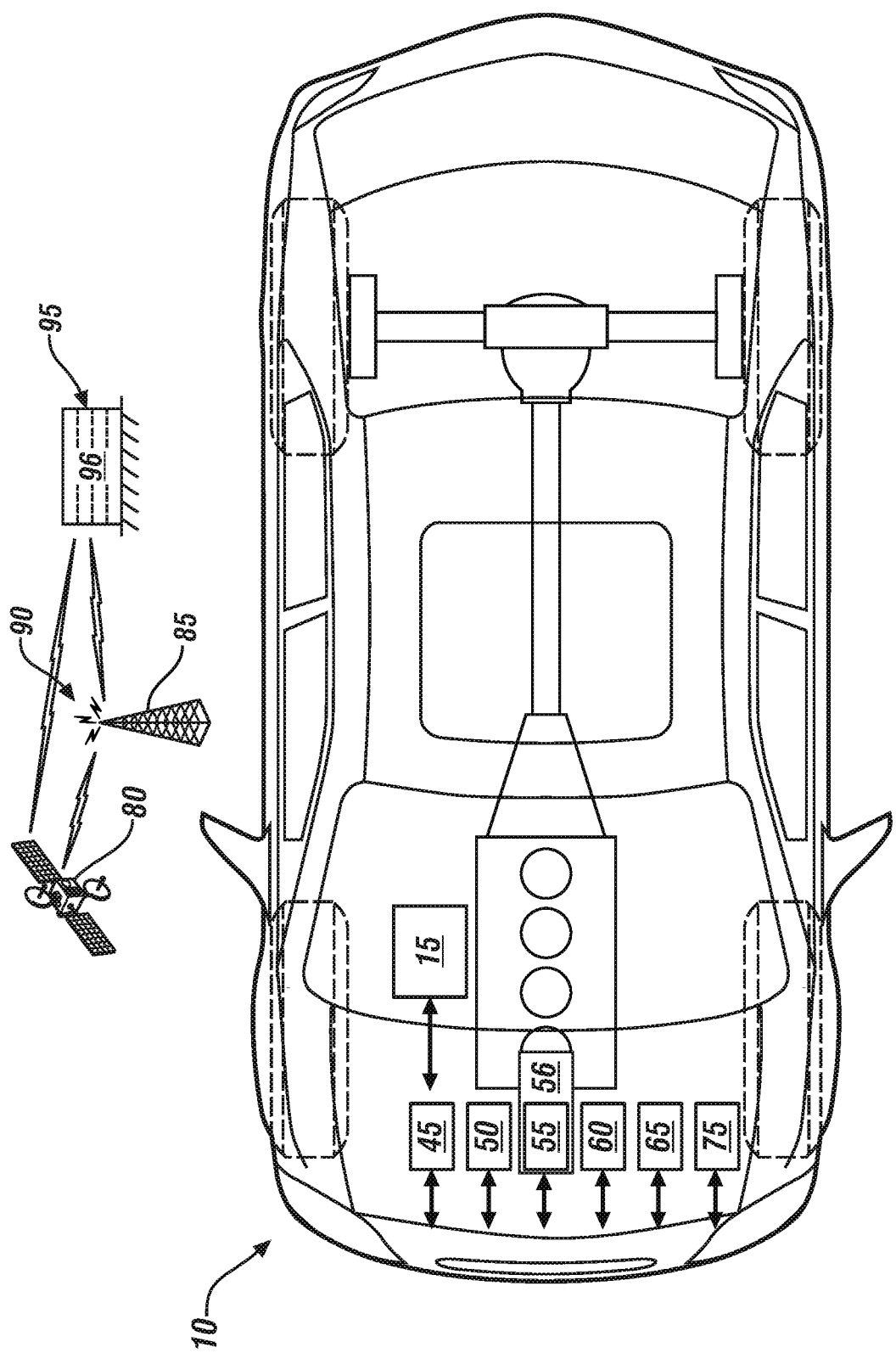
FIG. 1 schematically shows an embodiment of an autonomous vehicle that includes a Global Position System (GPS) sensor, a navigation system, a telematics device, and a spatial monitoring system, in accordance with the disclosure.

Referring now to the drawings, wherein the showings are for the purpose of illustrating certain exemplary embodiments and not for the purpose of limiting the same, FIG. 1 schematically shows an embodiment of a subject vehicle 10 that is configured with a navigation system 55. In one embodiment and as described herein, the subject vehicle 10 includes a Global Position System (GPS) sensor 50, a telematics device 60, a spatial monitoring system 65, a human-machine interface (HMI) system 75, one or more controllers 15, and an autonomous operating system 45 that is disposed to provide a level of autonomous vehicle operation. An on-vehicle navigation map 56 is stored on an on-vehicle controller that is in communication with the navigation system 55.

The subject vehicle 10 includes a telematics device 60, which includes a wireless telematics communication system capable of extra-vehicle communications, including communicating with a communication network system having wireless and wired communication capabilities. The telematics device 60 is capable of extra-vehicle communications that includes short-range vehicle-to-vehicle (V2V) communication and/or vehicle-to-infrastructure (V2x) communication, which may include communication with an infrastructure monitor, e.g., a traffic camera. Alternatively or in addition, the telematics device 60 has a wireless telematics communication system capable of short-range wireless communication to a handheld device, e.g., a cell phone, a satellite phone or another telephonic device. In one embodiment the handheld device is loaded with a software application that includes a wireless protocol to communicate with the telematics device 60, and the handheld device executes the extra-vehicle communication, including communicating with an off-board controller 95 via a communication network 90 including a satellite 80, an antenna 85, and/or another communication mode. Alternatively or in addition, the telematics device 60 executes the extra-vehicle communication directly by communicating with the off-board controller 95 via the communication network 90. A base navigation map 96 is stored in one or more memory devices of the off-board controller 95. The base navigation map 96 is a high-definition (HD) map that has a level of precision that is on an order of magnitude of meters with regard to location and an order of magnitude of centimeters with regard to object locations. The off-board controller 95 may be a cloud-based computing system or a back office computing system associated with a service provider. The term "cloud" and related terms may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The vehicle spatial monitoring system 65 includes a spatial monitoring controller in communication with a plurality of sensing devices. The vehicle spatial monitoring system 65 dynamically monitors an area proximate to the subject vehicle 10 and generates digital representations of observed or otherwise discerned remote objects. The spatial monitoring system 65 can determine a linear range, relative speed, and trajectory of each proximate remote object. The sensing devices of the spatial monitoring system 65 may include, by way of non-limiting descriptions, front corner sensors, rear corner sensors, rear side sensors, side sensors, a front radar sensor, and a camera in one embodiment, although the disclosure is not so limited. Placement of the aforementioned sensors permits the spatial monitoring system 65 to monitor traffic flow including proximate vehicles and other objects around the subject vehicle 10. Data generated by the spatial monitoring system 65 may be employed by a lane mark detection processor (not shown) to estimate the roadway. The sensing devices of the vehicle spatial monitoring system 65 can further include object-locating sensing devices including range sensors, such as FM-CW (Frequency Modulated Continuous Wave) radars, pulse and FSK (Frequency Shift Keying) radars, and lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other camera/video image processors which utilize digital photographic methods to 'view' forward and/or rear objects including one or more object vehicle(s). Such sensing systems are employed for detecting and locating objects in automotive applications and are useable with autonomous operating systems including, e.g., adaptive cruise control, autonomous braking, autonomous steering and side-object detection. The term "image" is employed herein to refer to a representation of a field of view (FOV) that is captured by a sensing device of the spatial monitoring system 65, and may include a pixelated image captured by a camera, a radar scan, a lidar scan, etc. The term "image" may also be referred to as a "sensor representation", which indicates that the outputs of sensors such as lidars and radars are scans, whereas the output of a camera is an image.

The sensing devices associated with the spatial monitoring system 65 are preferably positioned within the subject vehicle 10 in relatively unobstructed positions, and are capable of 3D sensing of the associated field of view (FOV). The sensing device may be arranged to capture an image of a FOV that is forward of the subject vehicle 10 in one embodiment. Alternatively, or in addition, the sensing device may be arranged to capture an image of a FOV that is beside the subject vehicle 10 and/or behind the subject vehicle 10 in one embodiment. An image may include a plurality of RGB or grayscale pixels that are captured at a predetermined resolution, in one embodiment. Each of these sensors provides an estimate of actual location or condition of an object, wherein said estimate includes an estimated position and standard deviation. As such, sensory detection and measurement of object locations and conditions may instead be referred to as 'estimates.' The characteristics of these sensors may be complementary in that some may be more reliable in estimating certain parameters than others. The sensing devices may have different operating ranges and angular coverages capable of estimating different parameters within their operating ranges. For example, radar sensors may estimate range, range rate and azimuth location of an object, but are not normally robust in estimating the extent of a detected object. A camera with vision processor is more robust in estimating a shape and azimuth position of the object, but may be less efficient at estimating the range and range rate of an object. Scanning type lidar sensors perform efficiently and accurately with respect to estimating range, and azimuth position, but typically cannot estimate range rate, and therefore may not be as accurate with respect to new object acquisition/recognition. Ultrasonic sensors are capable of estimating range but may be less capable of estimating or computing range rate and azimuth position. The performance of each of the aforementioned sensor technologies is affected by differing environmental conditions. Thus, some of the sensing devices may present parametric variances during operation, although overlapping coverage areas of the sensors create opportunities for sensor data fusion. Sensor data fusion includes combining sensory data or data derived from sensory data from various sources that are observing a common field of view such that the resulting information is more accurate and precise than would be possible when these sources are used individually.

The HMI system 75 provides for human/machine interaction, for purposes of directing operation of an infotainment system, the GPS sensor 50, the vehicle navigation system 55, a remotely located service center and the like. The HMI system 75 monitors operator requests and provides information to the operator including status of vehicle systems, service and maintenance information. The HMI system 75 communicates with and/or controls operation of a plurality of in-vehicle operator interface device(s). The HMI system 75 may also communicate with one or more devices that monitor biometric data associated with the vehicle operator, including, e.g., eye gaze location, posture, and head position tracking, among others. The HMI system 75 is depicted as a unitary device for ease of description, but may be configured as a plurality of controllers and associated sensing devices in an embodiment of the system described herein. The in-vehicle operator interface device(s) can include devices that are capable of transmitting a message urging operator action, and can include an electronic visual display module, e.g., a liquid crystal display (LCD) device, a heads-up display (HUD), an audio feedback device, a wearable device and a haptic seat.

The autonomous operating system 45 is disposed to provide a level of autonomous vehicle operation. The autonomous operating system 45 includes a controller and one or a plurality of subsystems that may include an autonomous steering system, an adaptive cruise control system, an autonomous braking/collision avoidance system and/or other systems that are configured to command and control autonomous vehicle operation separate from or in conjunction with operator requests. Autonomous operating commands may be generated to control the autonomous steering system, the adaptive cruise control system, the autonomous braking/collision avoidance system and/or the other systems. Vehicle operation includes operation in one of the propulsion modes in response to desired commands, which can include operator requests and/or autonomous vehicle requests. Vehicle operation, including autonomous vehicle operation includes acceleration, braking, steering, steady-state running, coasting, and idling. Operator requests can be generated based upon operator inputs to an accelerator pedal, a brake pedal, a steering wheel, a transmission range selector, and a cruise control system. Vehicle acceleration includes a tip-in event, which is a request to increase vehicle speed, i.e., accelerate the vehicle. A tip-in event can originate as an operator request for acceleration or as an autonomous vehicle request for acceleration. One non-limiting example of an autonomous vehicle request for acceleration can occur when a sensor for an adaptive cruise control system indicates that a vehicle can achieve a desired vehicle speed because an obstruction has been removed from a lane of travel, such as may occur when a slow-moving vehicle exits from a limited access highway. Braking includes an operator request to decrease vehicle speed. Steady-state running includes vehicle operation wherein the vehicle is presently moving at a rate of speed with no operator request for either braking or accelerating, with the vehicle speed determined based upon the present vehicle speed and vehicle momentum, vehicle wind resistance and rolling resistance, and driveline inertial drag, or drag torque. Coasting includes vehicle operation wherein vehicle speed is above a minimum threshold speed and the operator request to the accelerator pedal is at a point that is less than required to maintain the present vehicle speed. Idle includes vehicle operation wherein vehicle speed is at or near zero. The autonomous operating system 45 includes an instruction set that is executable to determine a trajectory for the subject vehicle 10, and determine present and/or impending road conditions and traffic conditions based upon the trajectory for the subject vehicle 10.

The term "controller" and related terms such as control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value.

FIGS. 2, 3, 4, and 5 schematically show details related to dynamically constructing and updating the on-vehicle navigation map 56 that is employed by the on-vehicle navigation system 55. This concept includes employing a crowd-sourced vehicle sensing system to build and update a context-aware sparse HD map augmented with semi-dynamic and static objects, which provides extended 3D vision to vehicles over larger timescales. The crowd-sourcing includes sharing sparse data with the cloud and then stitching the data accurately, robustly, and efficiently from multiple vehicles into a single sparse HD map representation. This includes a robust semantic segmentation driven approach to distinguish between dynamic, semi-dynamic and static objects in the environment.

Figure 2:
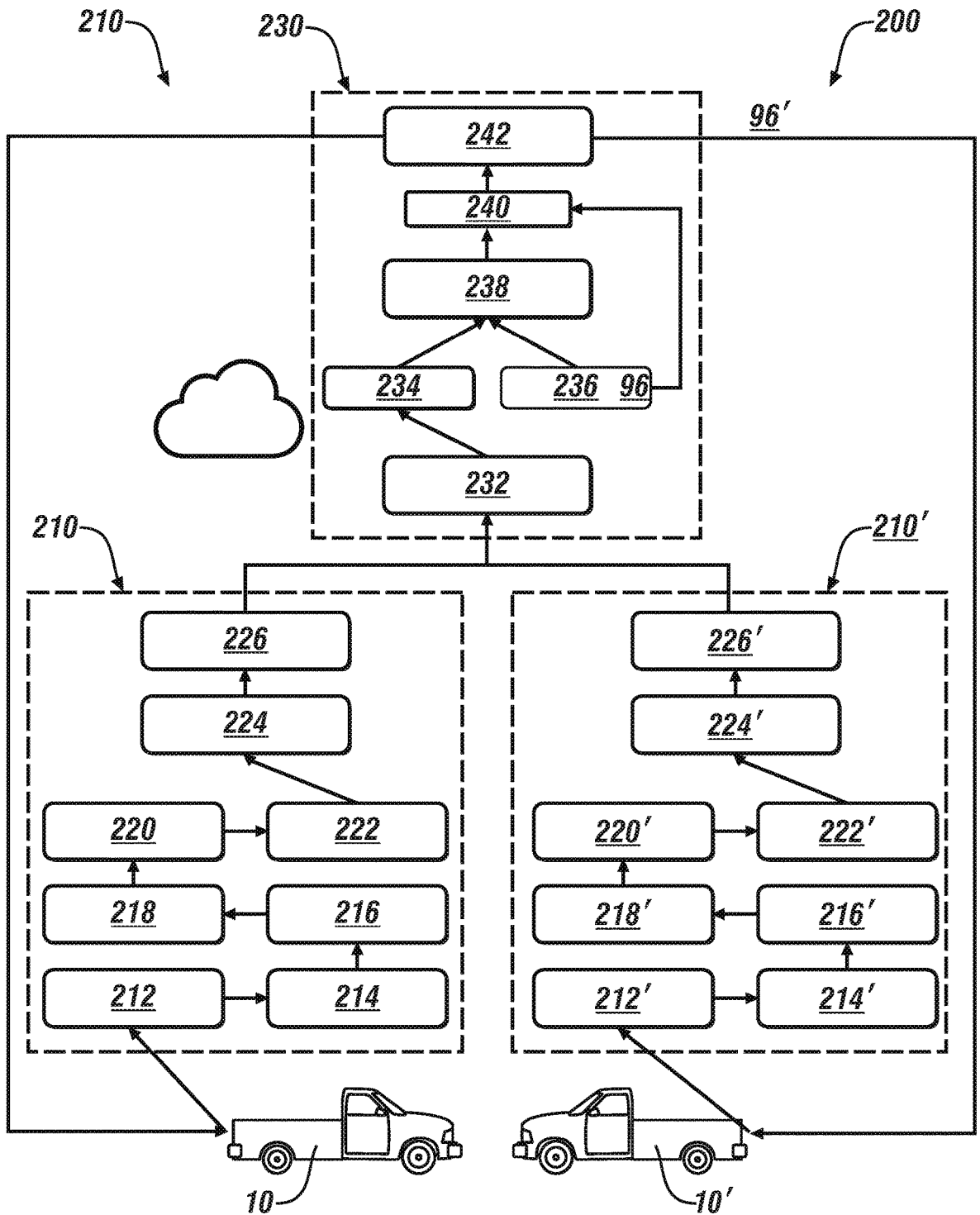
FIG. 2 schematically shows a system architecture that is employed by a subject vehicle, including a crowd-sourced vehicle sensing system to generate and dynamically update a context-aware sparse HD navigation map that has been augmented with semi-dynamic and static objects, in accordance with the disclosure.

FIG. 2 schematically shows a system architecture 200 that may be employed in an embodiment of the subject vehicle 10 that is described with reference to FIG. 1, wherein the system architecture 200 employs a crowd-sourced vehicle sensing system to generate and dynamically update a context-aware sparse HD navigation map that has been augmented with semi-dynamic and static objects. One objective of the novel system architecture 200 is to provide an extended 3D vision for the subject vehicle 10 over large time-scales, thus enhancing controllability when operating one or more of the subsystems of the autonomous operating system 45.

The system architecture 200 may be implemented on-vehicle employing the various systems that have been previously described and the on-vehicle controller 15. The system architecture 200 includes a first segment 210, which generates a parsimonious map representation 224 that can be communicated to a second segment 230. In one embodiment, the first segment 210 may be executed on-vehicle, and the second segment 230 may be executed by the off-board controller 95, which may be a cloud-based computing system or a back office computing system associated with a service provider.

The first segment 210 includes capturing a 3D image of a field of view that is proximal to the subject vehicle 10 via a sensing device of the spatial monitoring system 65, and simultaneously capturing an associated GPS location via the GPS sensor 50 (212). A feature extraction routine is executed to extract features from the 3D image (214). Feature extraction includes finding points of interest in the 3D image, e.g., corners or edges, and then calculating or otherwise determining their feature descriptors using surrounding pixels in the 3D image.

The extracted features from the 3D image are subjected to semantic segmentation (216), which includes executing a simultaneous location and mapping (SLAM) of the extracted features from the 3D image and the associated semantic segmentation (218). One embodiment of a semantic segmentation routine is described with reference to FIG. 3.

Context extraction from the simultaneous location and mapping of the extracted features is executed (220), which includes determining the object class each extracted feature belongs to, e.g., a road surface, a building, a tree, a traffic sign, a traffic signal, etc.

The on-vehicle navigation map 56 is updated based upon the context extraction (222).

A parsimonious map representation is generated based upon the updated on-vehicle navigation map (224), which includes stable features in the environment along with their 3D positions, descriptors, semantic labels, and vantage points. Furthermore, generating a parsimonious map representation based upon the updated on-vehicle navigation map includes executing feature selection and a utility prioritization capability.

The parsimonious map representation is communicated to the off-board controller 95 (226, 232), which executes the second segment 230.

The first segment 210 may be simultaneously implemented in the controllers on one or more other vehicles, as is schematically indicated by vehicle 10' with an analogous first segment 210' including analogous steps of 212' through 226'. As such, multiple vehicles may provide information in the form of parsimonious map representations 224 to the second segment 230.

The second segment 230 may be executed by the off-board controller 95, with input from one or multiple vehicles 10, 10' communicating parsimonious map representations 224, 224' thereto.

The second segment 230 includes the base navigation map 96 (236), and update(s) (234) in the form of the parsimonious map representations 224.

The base navigation map 96 (236) and update(s) (234) are provided as inputs to a sparse map stitching module (238), which executes stitching operation employing sparse map representations to update relevant segments of the base navigation map 96 (240), and the updated base navigation map 96' is subsequently communicated to the multiple vehicles 10, 10' (242). The sparse map stitching module (238) may include a one-shot relocalization routine, which is described in detail with reference to FIG. 4. Alternatively or in addition, the sparse map stitching module (238) may include a progressive relocalization routine, which is described in detail with reference to FIG. 5.

An austerity-generated map, such as the parsimonious map representations 224, include features and corresponding 3D locations where the respective features were collected, also referred to as key-frames.

Figure 3:
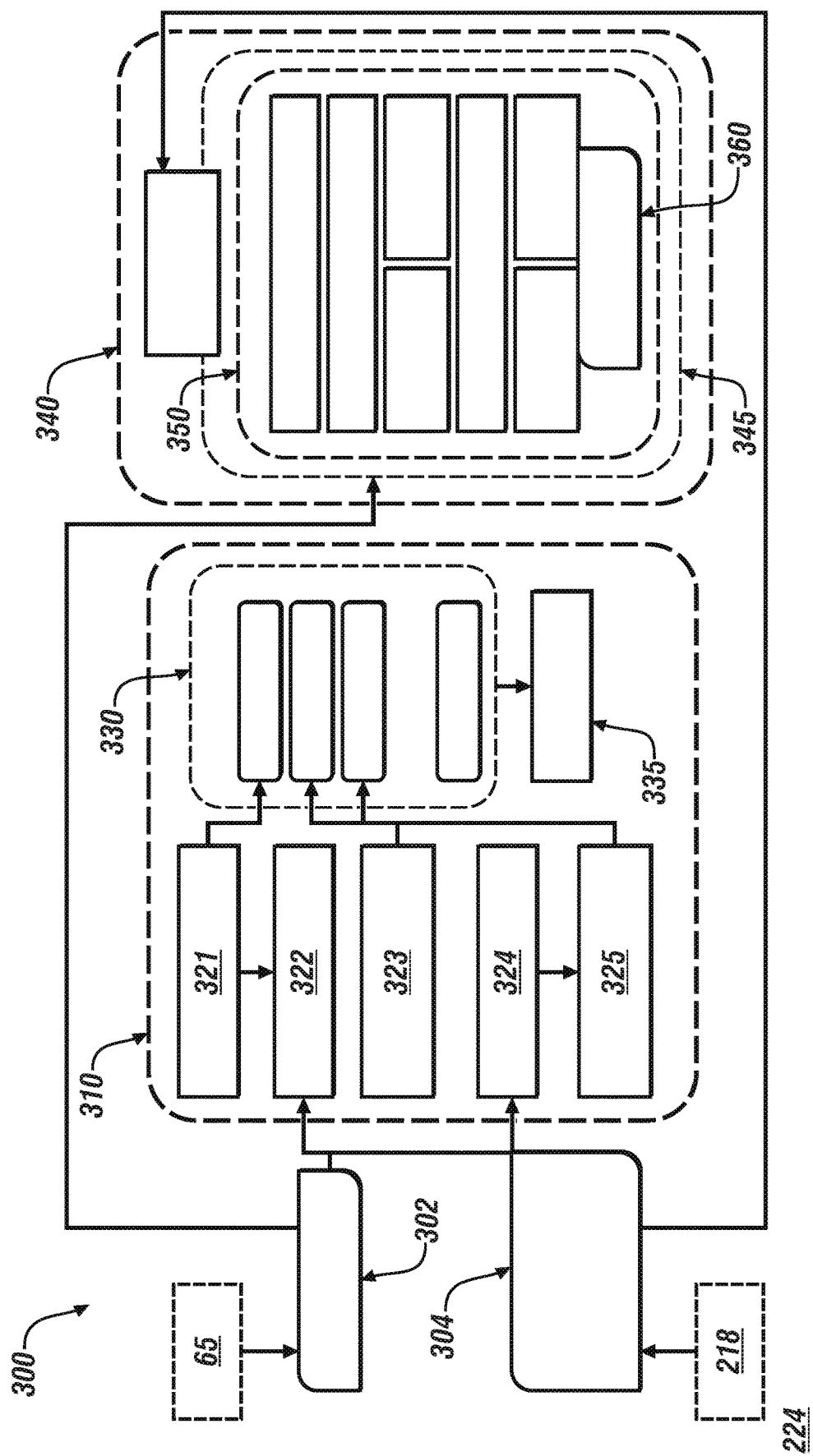
FIG. 3 schematically shows details related to a semantic segmentation routine that generates semantic labels and locations of semi-dynamic objects that are captured by a spatial monitoring system, in accordance with the disclosure.
Figure 4:
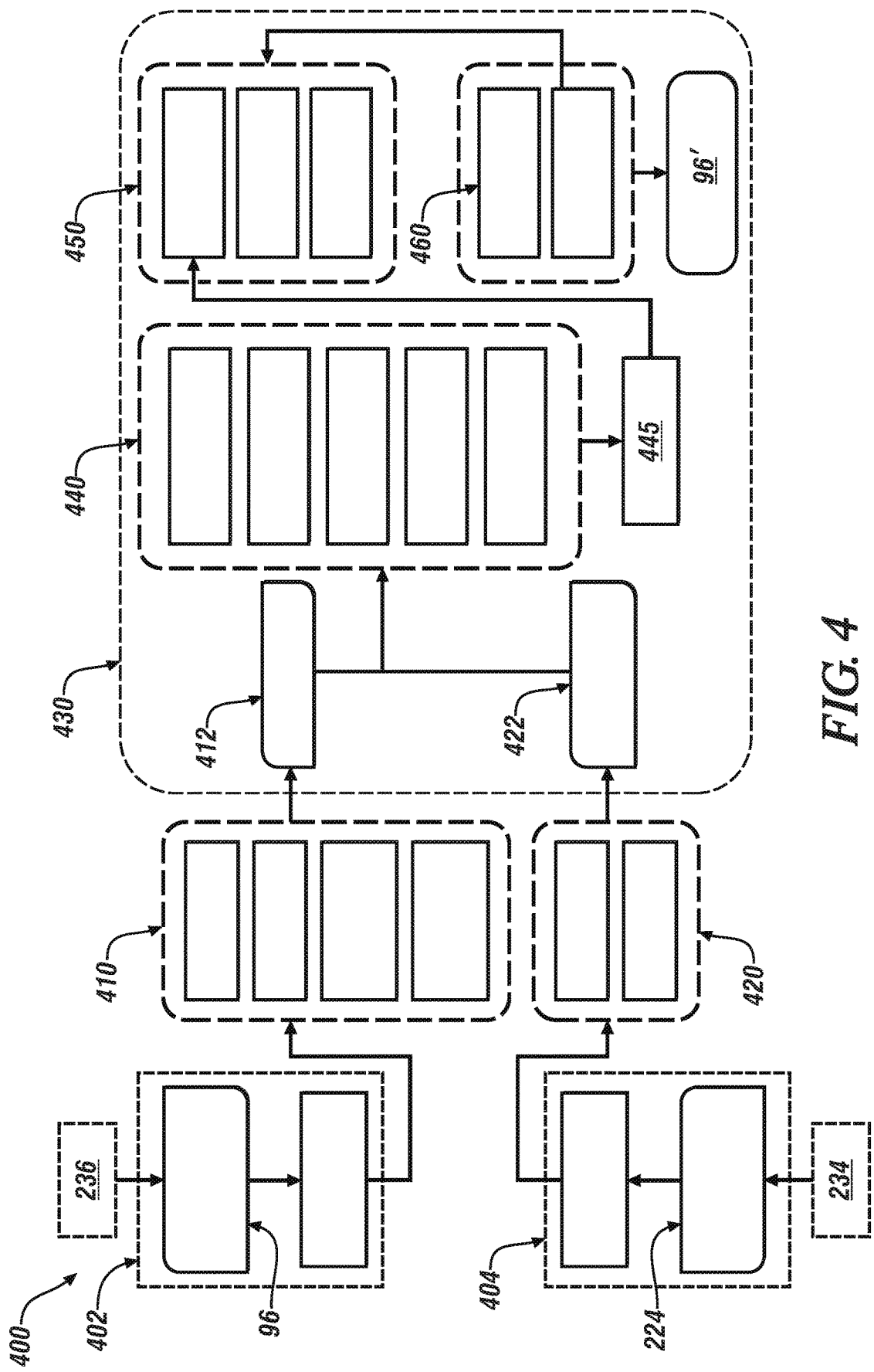
FIG. 4 schematically shows a one-shot relocalization routine, which includes localizing a single keyframe from an on-vehicle navigation map onto a base navigation map, in accordance with the disclosure.
Figure 5:
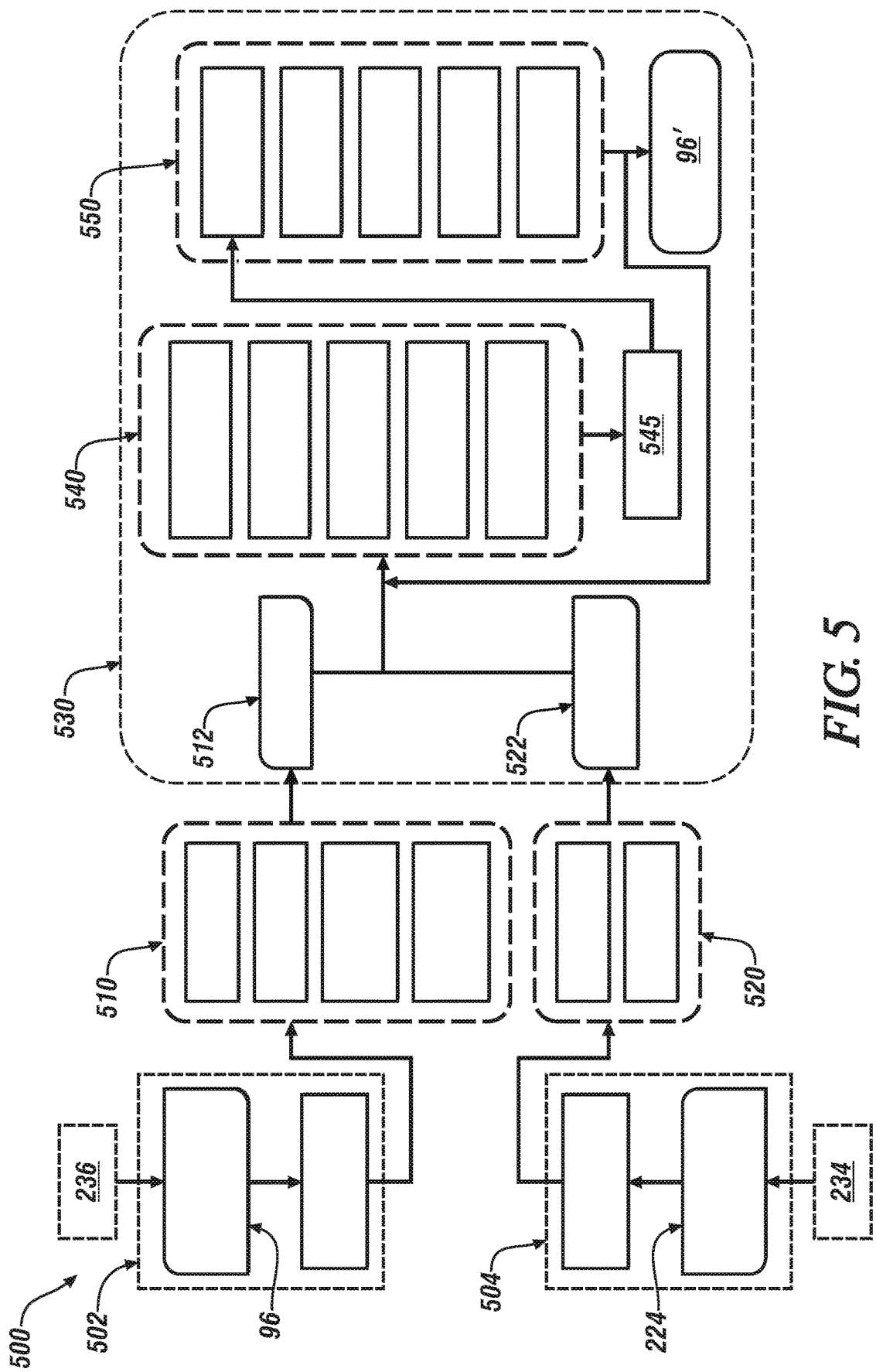
FIG. 5 schematically shows a progressive relocalization routine, which includes localizing the keyframes collected by the subject vehicle using a fusion of BoVWs (bag of visual words), feature mapping, and PnP solver modules, in accordance with the disclosure.

FIG. 3 schematically shows details related to a semantic segmentation routine 300, which generates semantic labels and locations of semi-dynamic objects (360) based upon stereo frame inputs 302 from the on-vehicle spatial monitoring system 65 and the semantic segmentation of extracted features from the 3D image 304, which are obtained from step (218) of FIG. 2. The semantic segmentation routine 300 executes a first routine to perform semantic labelling for a sparse austerity-feature map (310), which generates inputs to a segmentation-driven semi-dynamic object detection routine (340) which includes generating the semantic labels and locations of semi-dynamic objects (360). The semantic segmentation semantically labels each perceived feature with the class of object to which it belongs, e.g., a vehicle, a road surface, a building or other fixture, a pedestrian, etc.

This includes executing a simultaneous location and mapping (SLAM) process (321) to determine a 3D world position, and performing an ORB keypoint detection process on the stereo frame inputs 302 (322), which results in an ORB feature extraction (323) that generates an ORB descriptor. ORB (Oriented FAST and Rotated Brief) is a term that describes a fusion of FAST keypoint detector and BRIEF descriptor. FAST is a term that represents "Features from accelerated segment test" (FAST), and is a corner detection method that may be used to extract feature points and later used to track and map objects in computer vision. BRIEF (Binary Robust Independent Elementary Features) is a general purpose feature point descriptor routine that can be used for object recognition and 3D reconstruction.

The semantic segmentation of extracted features from the 3D image 304 is input to a semantic image segmentation routine, e.g., DeepLab (324), the result of which is subjected to a 2D keypoint to 3D map-point correspondence routine (325) to generate a semantic label.

The 3D world position from the SLAM process (321), the ORB descriptor from the ORB feature extraction (323) and the semantic label from the 2D keypoint to 3D map-point correspondence routine (325) are provided to a map-point step (330), which generates a semantic label consensus (335), and is provided to the inputs of a segmentation-driven semi-dynamic object detection routine (340) to generate the semantic labels and locations of semi-dynamic objects (360).

The segmentation-driven semi-dynamic object detection routine (340) executes the simultaneous location and mapping (SLAM) (345) of the extracted features from the 3D image and the associated semantic segmentation employing the semantic segmentation of extracted features from the 3D image 304 and the semantic label consensus (335). This includes localizing the features in the 3D map and executing a difference operation (350) that includes the steps of projecting features from the map 96 into the current scene, executing feature matching between map features and the current scene, identifying new features in the current scene and identifying features that are not present in the current scene, executing a semantic label filter to identify semi-dynamic objects and static objects, and generating the semantic labels and locations of semi-dynamic objects (360). The difference operation (350) uses the base navigation map and the current 3D scene to find out the features that have been displaced i.e., whether new features have been added or removed. Using the semantic labels appended with the features, context can thus be inferred about those objects.

Referring again to FIG. 4, with continued reference to elements of FIG. 2, the one-shot relocalization routine 400 is described, and includes localizing a single keyframe from the on-vehicle navigation map 56 onto the base navigation map 96, which includes developing a transformation matrix. Data structures associated with each keyframe include an identifier (kpID), a pose (kpPose) and a list of map-points (kpMPs), wherein each map-point includes an identifier, a feature descriptor, a semantic label, an object class, a reference keyframe, and a world position.

The transformation matrix can then be employed to transform remaining keyframes from the on-vehicle navigation map 56 onto the base navigation map 96. The base navigation map 96 is transferred to a memory device (402), and subjected to map reconstruction (410). Simultaneously, a new map segment, as may be in the form of the parsimonious map representations 224, is loaded into a memory device (404).

Map reconstruction (410) includes executing a keyframe database and a co-visibility graph in conjunction with an entire keyframe reconstruction to effect a map-point level reconstruction of the base navigation map 96, referred to as a reconstructed base navigation map 412. Coincidentally the parsimonious map representations 224 are subjected to partial reconstruction (420), which includes determining a keyframe BoVW (bag of visual words) vector, and finding two-dimensional (2D) projections of the map-points associated with the parsimonious map representations 224 to determine a new map segment 422.

The reconstructed base navigation map 412 that is output from the map reconstruction step (410) and the new map segment 422 that is output from the partial reconstruction step (420) are provided as inputs to a one-shot stitching module 430. The one-shot stitching module 430 includes a relocalization step 440, a keyframe addition step 450, and a global transformation step 460, which combine to generate a robust, austerity generated stitched base navigation map 96.

The relocalization step 440 includes executing a BoVW key word matching routine, a map-point matching routine, a PnP (perspective-n-point) solver routine, a RANSAC routine, and a pose optimization routine, from which a transformation matrix 445 is generated.

The BoVW key word matching routine includes matching key visual words between the reconstructed base navigation map 412 and the new map segment 422.

The map-point matching routine includes feature matching of key points based on their descriptors as well as their 3D positions.

The PnP solver routine is related to estimating the pose of the camera, i.e., the location and perspective of the sensor of the on-vehicle spatial monitoring system 65, based upon the 3D points in an image and their corresponding 2D projections in an image.

The RANSAC (Random Sample Consensus) routine detects and removes outliers in the dataset employing an iterative process that estimates parameters in an associated mathematical model from a set of observed data.

The pose optimization routine includes using 2D key points observed by the sensor along with 3D coordinates in the map to optimize the calculated pose of the camera, or the radar sensor or the lidar sensor.

The keyframe addition step 450 employs the transformation matrix 445 generated by the relocalization step 440 to transform map-points to the base navigation map 96, match map-points with those in the base navigation map 96, and remove redundant map-points.

The global transformation step 460 transforms the next keyframe to the base navigation map 96 to generate an updated version of the base navigation map 96.

Referring again to FIG. 5, with continued reference to elements of FIG. 3, the progressive relocalization routine 500 includes localizing the keyframes collected by the subject vehicle 10 using a fusion of BoVWs (bag of visual words), feature mapping, and PnP solver modules. This includes the base navigation map 96 being transferred to a memory device (502), and subjected to map reconstruction (510). Map reconstruction (510) includes executing a keyframe database and a co-visibility graph in conjunction with an entire keyframe reconstruction to effect a map-point level reconstruction of the base navigation map 96, referred to as a reconstructed base navigation map 512. Coincidentally the parsimonious map representations 224 are subjected to partial reconstruction (520), which includes determining a keyframe BoVW (bag of visual words) vector, and finding two-dimensional (2D) projections of the map-points associated with the parsimonious map representations 224 to determine a new map segment 522.

The reconstructed base navigation map 512 that is output from the map reconstruction step (510) and the new map segment 522 that is output from the partial reconstruction step (520) are provided as inputs to a progressive relocalization stitching module 530. The progressive relocalization stitching module 530 includes a relocalization step 540 and a keyframe addition step 550, which combine to generate a robust, austerity generated stitched base navigation map 96. Simultaneously, a new map segment, as may be in the form of the parsimonious map representations 224, is loaded into a memory device (504).

The relocalization step 540 includes executing a BoVW key word matching routine, a map-point matching routine, a PnP (perspective-n-point) solver routine, a RANSAC routine, and a pose optimization routine, from which a transformation matrix 545 is generated.

The BoVW key word matching routine includes matching key visual words between the reconstructed base navigation map 512 and the new map segment 522.

The map-point matching routine includes matching corresponding features from a different frame of the same vehicle, or matching corresponding frames from different vehicles in the same geographic location.

The PnP solver routine is related to estimating the pose of the camera, i.e., the location and perspective of the sensor of the on-vehicle spatial monitoring system 65, based upon the 3D points in an image and their corresponding 2D projections in an image.

The RANSAC (Random Sample Consensus) routine detects and removes outliers in the dataset employing an iterative process that estimates parameters in an associated mathematical model from a set of observed data.

The keyframe addition step 550 employs the transformation matrix 545 generated by the relocalization step 540 to transform map-points to the base navigation map 96, match map-points with those in the base navigation map 96, and remove redundant map-points. The keyframe addition step 550 further constructs a BoVW vector, which it adds to a keyframe database, and then adds the keyframe to the base navigation map 96 to generate an updated version of the base navigation map 96.

In this manner, the updated base navigation map 96' is subsequently communicated to the multiple vehicles 10, 10' based upon the parsimonious map representation, which includes updating the on-vehicle navigation map 56 based upon the cloud-based navigation map 96.

The concepts described herein employ Application Programming Interfaces (APIs) to facilitate data uploads and downloads between the subject vehicle 10 and the off-board controller 95. One API is a vehicle-to-cloud API, which includes uploading of data from the subject vehicle 10 to the off-board controller 95. This includes: GetMapSegment, which includes the GPS position of the subject vehicle 10; GetMapUpdates, which includes GPS/SLAM position; and, GetSemiDynamicObjects, which includes GPS/SLAM position. The vehicle-to-cloud API also includes uploading data from the off-board controller 95 to the subject vehicle 10. This includes: UploadMapSegment, which includes the relevant map segment; and UpdateMapSegment, which includes the map update, with associated features.

A second API is a cloud-to-vehicle API, which includes downloading data from the off-board controller 95 to the subject vehicle 10. This includes: GetMapSegmentUpdates, which includes GPS position and vehicle ID of the subject vehicle 10; and, GetSemiDynamicObjects, which also includes GPS position and vehicle ID of the subject vehicle 10. The cloud-to-vehicle API also includes uploading data from the off-board controller 95 to the subject vehicle 10. This includes: UploadMapUpdates, which includes GPS position of the subject vehicle 10; and UpdateMapSegment, which includes the map segment and the update.

The concepts described herein provide a robust semantic segmentation driven approach to distinguish between dynamic, semi-dynamic and static objects in the environment. It also uses semantically labeled environmental features embedded in the sparse feature maps to infer temporal changes in the environment. In one embodiment, the concepts described herein may outperform other sensing systems by using crowd-sourcing to share sparse data over V2X from a plurality of vehicles with the cloud and then stitching the data accurately, robustly, and efficiently from multiple vehicles into a single sparse HD map representation. In this way, efficiencies in the use of wireless bandwidth, map collection time and stitch may be achieved in the presence of sparse data.

The concepts employ visual simultaneous localization and mapping (SLAM) as well as semantic segmentation tools, taking into account the accuracy of vision SLAM, semantic segmentation and the capacity/latency of V2X communication technologies. Such operation may bring operation within the limits of LTE/4G communication technology. Furthermore, the austerity operation removes non-essential map components without which the integrity of the map is still intact.

The teachings may be described herein in terms of functional and/or logical block components and/or various processing steps. It should be realized that such block components may be composed of hardware, software, and/or firmware components that have been configured to perform the specified functions. Embodiments may also be implemented in cloud computing environments. The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for controlling a subject vehicle, wherein the subject vehicle includes a first controller, an extra-vehicle communication system, a GPS sensor, a spatial monitoring system, and a navigation system that employs an on-vehicle navigation map, the method comprising:
    capturing, via the spatial monitoring system, a 3D sensor representation of a field of view proximal to the subject vehicle and an associated GPS location;
    executing a feature extraction routine to extract features from the 3D sensor representation;
    executing a semantic segmentation of the extracted features from the 3D sensor representation;
    executing a simultaneous location and mapping of the extracted features from the 3D sensor representation and the associated semantic segmentation of the extracted features from the 3D sensor representation;
    executing a context extraction from the simultaneous location and mapping of the extracted features;
    updating the on-vehicle navigation map based upon the context extraction;
    generating a parsimonious map representation based upon an updated on-vehicle navigation map, wherein the parsimonious map representation includes feature descriptors, semantic labels, 3D positions, and vantage points of the extracted features;
    communicating the parsimonious map representation to a second controller, wherein the second controller is an off-board controller;
    executing, via the second controller, sparse map stitching to update a base navigation map based upon the parsimonious map representation, including executing a progressive relocalization scheme by localizing a plurality of keyframes collected by the subject vehicle using a fusion of a bag of visual words (BoVWs), feature mapping, and a perspective-n-point (PnP) solver routine, wherein the PnP solver routine estimates a location and a perspective of a sensor of the spatial monitoring system based upon 3D points in an image and corresponding 2D projections in an image;
    wherein the 3D points in the image include the 3D sensor representation of the field of view proximal to the subject vehicle; and
    wherein the 2D projections in the image are elements of the parsimonious map representation; and
    updating the on-vehicle navigation map based upon the base navigation map.

2. The method of claim 1, further comprising controlling operation of the subject vehicle based upon the updated on-vehicle navigation map.

3. The method of claim 2, wherein the subject vehicle further comprises an autonomous operating system, and wherein controlling operation of the subject vehicle based upon the updated on-vehicle navigation map comprises controlling the autonomous operating systems based upon the updated on-vehicle navigation map.

4. The method of claim 1, wherein generating a parsimonious map representation based upon the updated on-vehicle navigation map comprises executing a feature selection and a utility prioritization capability.

5. The method of claim 1, wherein executing, via the second controller, sparse map stitching to update a cloud-based navigation map based upon the parsimonious map representation comprises executing the sparse map stitching employing a sparse representation of a map segment.

6. The method of claim 1, wherein executing, via the second controller, sparse map stitching to update a cloud-based navigation map based upon the parsimonious map representation comprises executing a one-shot relocalization scheme, wherein executing the one-shot relocalization scheme includes:
    developing a transformation matrix;
    localizing a single keyframe from the on-vehicle navigation map onto the base navigation map; and
    employing the transformation matrix to transform remaining keyframes from the on-vehicle navigation map onto the base navigation map.

7. The method of claim 1, wherein executing the simultaneous location and mapping of the extracted features from the 3D sensor representation and the associated semantic segmentation comprises adding semantic segmentation to the simultaneous localization and mapping (SLAM) to the on-vehicle navigation map.

8. The method of claim 1, wherein the off-board controller is cloud-based.

9. The method of claim 1, wherein the off-board controller comprises a remotely located back office controller.

10. The method of claim 1, wherein capturing, via the spatial monitoring system, a 3D sensor representation of a field of view proximal to the subject vehicle comprises captures a 3D sensor representation that is forward of the subject vehicle.

11. The method of claim 1, wherein the on-vehicle navigation map comprises a high-definition navigation map.

12. A vehicle, comprising:
    an on-board controller, an extra-vehicle communication system, a GPS sensor, a navigation system that operates employing an on-vehicle navigation map, and a spatial monitoring system arranged to determine a linear range, relative speed, and trajectory of a plurality of proximate remote objects, some of which may be semi-dynamic and static objects;
    a memory device including an encoded datafile including a first routine arranged to generate a parsimonious HD map representation, the first routine executable by the on-board controller to:

capture, via the spatial monitoring system, a 3D sensor representation of a field of view proximal to the vehicle and an associated GPS location;
execute feature extraction from the 3D sensor representation;
execute semantic segmentation of the extracted features from the 3D sensor representation;
execute simultaneous location and mapping of the extracted features from the 3D sensor representation and the associated semantic segmentation;
execute context extraction;
update the on-vehicle navigation map;
generating a parsimonious map representation based upon an updated on-vehicle navigation map, wherein the parsimonious map representation includes feature descriptors, semantic labels, 3D positions, and vantage points of the extracted features; and
communicate the parsimonious map representation to a second controller;
wherein the second controller includes an encoded datafile including a second routine, the second routine executable to perform sparse map stitching to update a cloud-based navigation map based upon the parsimonious map representation and update the on-vehicle navigation map based upon the cloud-based navigation map;
wherein the sparse map stitching to update a cloud-based navigation map based upon the parsimonious map representation includes executing a progressive relocalization scheme by localizing a plurality of keyframes collected by the subject vehicle using a fusion of a bag of visual words (BoVWs), feature mapping, and a perspective-n-point (PnP) solver routine, wherein the PnP solver routine estimates a location and a perspective of a sensor of the spatial monitoring system based upon 3D points in an image and corresponding 2D projections in an image;
wherein the 3D points in the image include the 3D sensor representation of the field of view proximal to the subject vehicle; and
wherein the 2D projections in the image are elements of the parsimonious map representation; and
wherein the on-board controller is arranged to the control operation of the vehicle based upon the updated on-vehicle navigation map.

13. The vehicle of claim 12, wherein the second controller is cloud-based.

14. The vehicle of claim 12, wherein the second controller comprises a remotely located back office controller.

15. The vehicle of claim 12, wherein the on-vehicle navigation map comprises a high-definition navigation map.

16. The vehicle of claim 12, wherein the first routine being executable to capture, via the spatial monitoring system, a 3D sensor representation of a field of view proximal to the vehicle comprises the first routine executable to capture a 3D sensor representation that is forward of the vehicle.

17. The vehicle of claim 12, wherein the vehicle includes an autonomous operating system, and wherein controlling operation of the vehicle based upon the updated on-vehicle navigation map comprises controlling the autonomous operating system based upon the updated on-vehicle navigation map.

* * * * *